United States Patent [19]

Mori et al.

[11] Patent Number: 5,039,575
[45] Date of Patent: Aug. 13, 1991

[54] SINGLE BODY AND COMPOSITE SLIDING MEMBERS

[75] Inventors: Sanae Mori; Masaaki Sakamoto, both of Nagoya; Atushi Hoda; Teruo Imai, both of Shizuoka; Yoshihisa Gotoh; Toshihiko Tutumi, both of Yokohama, all of Japan

[73] Assignee: Daido Metal Company Ltd., Nagoya, Japan

[21] Appl. No.: 337,228

[22] Filed: Apr. 12, 1989

[51] Int. Cl.$^5$ .............................................. B32B 15/08
[52] U.S. Cl. .................................. 428/463; 428/908.8
[58] Field of Search ............ 428/461, 457, 463, 908.8; 75/253

[56] References Cited

U.S. PATENT DOCUMENTS

| | | | |
|---|---|---|---|
| 4,540,630 | 9/1985 | Wegner et al. | 428/461 |
| 4,592,782 | 6/1986 | Davies | 75/253 |
| 4,623,590 | 11/1986 | Hodes et al. | 428/908.8 |

FOREIGN PATENT DOCUMENTS

| | | |
|---|---|---|
| 0204520 | 5/1985 | European Pat. Off. . |
| 0270997 | 12/1986 | European Pat. Off. . |
| 0270998 | 12/1986 | European Pat. Off. . |
| 0275038 | 1/1987 | European Pat. Off. . |
| 59-2839 | 1/1984 | Japan . |
| 59-182843 | 10/1984 | Japan . |
| 63-297457 | 12/1988 | Japan . |

Primary Examiner—Thomas J. Herbert, Jr.
Attorney, Agent, or Firm—Browdy and Neimark

[57] ABSTRACT

The present invention provides single body and composite sliding members comprising a resin composition containing 30-98% by weight of an aromatic polyether ketone, 1-35% by weight of polytetrafluoroethylene and 1-35% by weight of a metal fluoride, and single and composite sliding members comprising a resin composition containing 30-97% by weight of an aromatic polyether ketone, 1-35% by weight of polytetrafluoroethylene, 1-35% by weight of a metal fluoride and 1-20% by weight of potassium titanate fiber. These sliding members are remarkably improved in low frictional properties and wear resistance in comparison with the conventional products and therefore very useful.

16 Claims, No Drawings

SINGLE BODY AND COMPOSITE SLIDING MEMBERS

FIELD OF THE INVENTION AND RELATED ART

1. Field of the Invention

This invention relates to single body and composite sliding members excellent in low frictional properties and wear resistance.

2. Related Art

A resin composition for single body sliding members, which is mainly composed of an aromatic polyether ketone, had been developed by the present inventors through their studies, and a patent application has been filed for such resin composition under Japanese Patent Application Kokai (Laid-Open) No. 63- 297457 (JPN Pat. Appln. No. 62-134401). On the other hand, regarding materials for the composite sliding members, there are known the composite materials comprising a porous metal backing which is impregnated and coated on its surface with a composition comprising a mixture of graphite fiber, with a composition comprising a mixture of graphite fiber, polytetrafluoroethylene (hereinafter referred to as PTFE), graphite, bronze or the like and polyether ketone, as for instance disclosed in Japanese Patent Application Kokai (Laid-Open) Nos. 59-2839 and 59-182843.

The single body sliding members using said resin composition were still unsatisfactory in respects of mechanical strength such as load resistance, heat conductivity, wear resistance, baking resistance and dimensional stability, especially in use for industrial machines, vehicles, etc., where use of said members under relatively rigorous conditions in required. On the other hand, said conventional composite sliding members were not always satisfactory in frictional properties and wear resistance which are the very important factors for the sliding properties.

OBJECT AND SUMMARY OF THE INVENTION

The object of this invention is to solve the problems, such as mentioned above, held by the single body sliding members based on said prior invention and the conventional composite sliding members.

In order to attain said object, the present invention is schemed to provide the following structures:

(1) A single body sliding member comprising a resin composition (a) described below.
(2) A single body sliding member comprising a resin composition (b) described below.
(3) A composite sliding member comprising a metal-backed porous layer which is impregnated and coated on its surface with a resin composition (a) described below.
(4) A composite sliding member comprising a metal-backed porous layer which is impregnated and coated on its surface with a resin composition (b) described below.

| Resin composition (a) | |
|---|---|
| Aromatic polyether ketone | 30-98% by weight |
| Polytetrafluoroethylene | 1-35% by weight |
| Metal fluoride | 1-35% by weight |
| Resin composition (b) | |
| Aromatic polyether ketone | 30-97% by weight |
| Polytetrafluoroethylene | 1-35% by weight |
| Metal fluoride | 1-35% by weight |
| Potassium titanate fiber | 1-20% by weight |

When the term "single body sliding member" is used in this specification, it means a sliding member molded singly from a resin composition as described in (1) and (2) above. The term "composite sliding member" refers to a sliding member in which a resin composition is impregnated in and coated on the metal backed porous layer as described in (3) and (4) above.

DETAILED DESCRIPTION OF THE PREFERRED EMBODIMENTS

The aromatic polyether ketone used in this invention is preferably a crystalline aromatic thermoplastic resin polyether ether ketone (hereinafter referred to as PEEK) having the repeating units represented by the following formula (1):

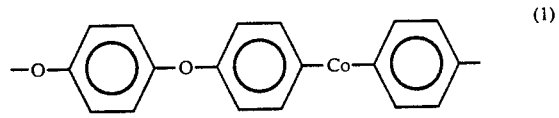

PEEK may contain the following repeating units beside the repeating units (1):

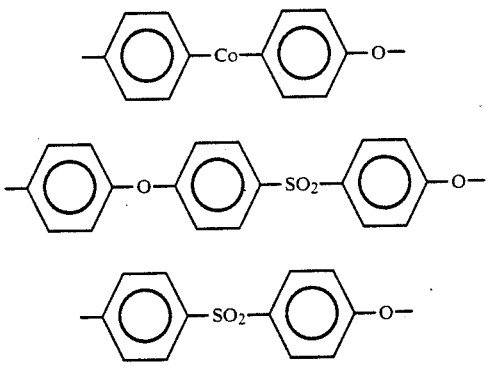

In spite of its high crystal melting point which is 334° C., PEEK is capable of hot-melt injection molding.

The continuous working temperature of PEEK is as high as 240° C. - the highest level of the existing thermoplastic resins.

These aromatic polyether ketones can be produced by the known methods such as described in Japanese Patent Kokai (Laid-Open) No. 54-90296. In the present invention, one or a mixture of two or more of such polyether ketones is used.

The preferred PEEK for use in this invention is the one whose melt flow index measured according to ASTM D-1238 under the conditions of 360° C. and loading of 2.16 kg is in the range of 1 to 5 g/10 min.

In the present invention, the content of PTFE in the aromatic polyether ketone should be in the range of 1 to 35%, preferably 5 to 25% by weight. Any smaller PTFE content than 1% results in a reduced effect for improvement of low frictional properties, baking resistance and critical PV value. On the other hand, when the PTFE content exceeds 35%, the resin composition is lowered in strength, causing a reduction of wear resistance, load-bearing characteristics and creep resistance and a deterioration of molding workability.

Examples of the metal fluoride usable in this invention are zinc fluoride, aluminum fluoride, iron fluoride, potassium fluoride, lead fluoride, calcium fluoride, copper fluoride, cadmium fluoride, barium fluoride, lithium fluoride, magnesium fluoride and the like. Among them, lead fluoride and/or calcium fluoride are especially preferred.

The content of such metal fluoride in the composition of this invention should be in the range of 1 to 35% by weight, preferably 2 to 20% by weight. When the content of metal fluoride is less than 1%, the effect of improving load-bearing characteristics, wear resistance, baking resistance, frictional properties and creep resistance is reduced, whilst when the metal fluoride content exceeds 35%, the resin composition is lowered in strength the effect of improving frictional properties is reduced, and also molding workability is deteriorated.

In the present invention, it is possible to additionally use potassium titanate fiber. In this case, the content of such potassium titanate fiber should be confined within the range of 1 to 20%, preferably 2 to 15% by weight. When the content of potassium titanate fiber is less than 1% by weight, the effect of improving load-bearing characteristics, wear resistance, baking resistance and creep resistance is reduced. On the other hand, when this content exceeds 20% by weight, there result a reduction of frictional properties and a deterioration of molding workability.

The resin composition used in this invention comprises either a mixture of three substances, viz. PEEK, PTFE and metal fluoride or a mixture of four substances, viz. said three substances plus potassium titanate fiber. In either case it is necessary that the mixture is a homogeneous mixture.

Various means are available for the production of both single body and composite sliding members. For instance, powder or pellets of PEEK, are added with powders of PTFE, metal fluoride and potassium titanate fiber, and they are prebended by a mixture such as Henschel mixer, super mixer, ribbon blender, etc. This homogenous powdery mixture, when producing a single body sliding member, is molded into a desired form of sliding member by injection molding or other means. In case of producing a composite sliding member, said homogeneous powdery mixture or a pelletized version thereof is directly applied to a porous substrate, or said mixture is made into a sheet by a suitable molding method and this sheet is heated to a temperature higher than the melting points of the component resins for effecting impregnation and coating of the porous substrate with the sheet composition. The following methods are also usable: said homogeneous powdery mixture is supplied into a melt extruder to directly form a sheet and effect impregnation and coating of the porous substrate with the sheet composition; said mixture is pelletized and ten supplied into a melt extruder to make a sheet and effect impregnation and coating of the porous substrate. In this invention, as far as the effect of the invention is not adversely affected, it is possible to add where necessary a fibrous reinforcement (such as carbon fiber, glass fiber, ceramic fiber, aromatic amide fiber, etc.), granular filler (such as calcium carbonate, talc, clay, silica, graphite, graphite fluoride, aluminum oxide, chromium oxide, zinc oxide, tin oxide, antimony oxide, cadmium oxide, molybdenum disulfide, wollastonite, etc.), antioxidant, thermal stabilizer, ultraviolet absorber, lubricant, releasing agent (such as various types of oil, waxes, stearic acid and its salts, esters, half esters, stearyl alcohol, stearamide, etc.), dye and pigment (such as cadmium sulfide, phthalocyanine, carbon black, titanium oxide, iron oxide, lead oxide, cobalt oxide, etc.), and other thermoplastic resins (such as polyamide, polycarbonate, polyetherimide, polysulfone, polyether sulfone, polyphenylene sulfide, aromatic polyester, etc.) and thermosetting resins (such as phenol resin, epoxy resin, silicone resin, polyimide, polyamideimide, etc.).

EXAMPLES

Examples of the products according to our previous invention (Japanese Patent Application Kokai No. 63-297457), the products according to the present invention and the conventional products will be described below. Used as component materials in these examples were: PEEK 450G (trade name of PEEK produced by ICI Corp., U.K.; M.F.I.: 3.1 g/10 min), tetrafluoroethylene resin M-12 (trade name, available from Daikin Kogyo KK, used as PTFE), lead fluoride produced by Junsei Kagaku KK, calcium fluoride produced by Junsei Kagaku KK), TISMO-D (trade name of potassium titanate fiber produced by Otsuka Kagaku Yakuhin KK), Blue P (trade name of graphite produced by Nippon Kokuen Kogyo KK), carbon fiber of pitch origin M-107T (trade name, produced by Kureha Kagaku Kogyo KK), and carbon fiber of PAN origin TOREKA CHOPPED STRAND T008A-003 (trade name produced by Toray Corporation). The component materials of the compositions shown in Table 2 were first dry blended and then extruded while melting and mixing by a 40 mm$\phi$ extruder (extruding temperature: 360° C.) to obtain pellets of uniform blend. These pellets were injection molded by using an ordinary injection molding machine to form the single sliding members according to our previous invention (Japanese Patent Application Kokai No. 63-297457) (Specimen Nos. 1-10), present invention (Specimen Nos. 11-16) and conventional method (Specimen Nos. 17 and 18). The products were subjected to a frictional wear test under the conditions shown in Table 1. The test results were as shown in Table 2.

TABLE 1

| Frictional wear test conditions | |
| --- | --- |
| Testing machine | Thrust type frictional wear tester |
| Dimensions of specimens | 50 mm × 50 mm × 1.5 mm |
| Load | 100 kgf/cm$^2$ |
| Peripheral speed | 0.05 m/sec |
| Testing time | 4 hours |
| Lubricating oil | None |

The composite sliding members according to the present invention (Specimen Nos. 11-16) were produced in the following way. The homogeneous pellets of the compositions shown in Table 2 were made into 0.40 mm thick sheets by a sheet extruder (extruding temperature: 360° C.). In a separate operation, bronze powder was applied to a thickness of 0.4 mm on a 0.80 mm thick copper backing and sintered at 800° C. to form a porous body. Then this copper-backed porous body was heated to 350° C. and said sheet was overlaid on said porous body and passed between rolls to have said porous body and its surface impregnated and coated with the sheet composition. The conventional composite sliding members (Specimen Nos. 17 and 18) were obtained by applying the uniformly mixed powder of the compositions shown in Table 2 on said porous body and heating them to 350° C. to effect impregnation and coating of said porous body with the powder composition. These composite sliding members were subjected to said frictional wear test under the conditions shown in Table 2, the test results being shown in Table 2.

It is to be understood that the present invention is not limited to the above-described examples but can be embodie in various other forms without departing from the claimed scope and spirit of the invention.

As seen from Table 2, the composite sliding members according to the present invention (Specimen Nos. 11-16) are remarkably improved in low frictional properties and wear resistance in comparison with the single body sliding members of the previous invention (Japanese Patent Application Kokai No. 63-297457) Specimen Nos. 1-10) and the conventional composite sliding members (Specimen Nos. 17 and 18), and thus the intended object of this invention can be attained.

TABLE 2

| | Specimen No. | PEEK | Pitch type carbon fiber | PAN type carbon fiber | Lead fluoride | Calcium fluoride | PTFE | Graphite | Potassium titanate fiber | Bronze |
|---|---|---|---|---|---|---|---|---|---|---|
| Products of previous invention (Japanese Patent Application Kokai No. 63-297457) | 1 | 99 | — | — | 1 | — | — | — | — | — |
| | 2 | 92 | — | — | 8 | — | — | — | — | — |
| | 3 | 80 | — | — | 20 | — | — | — | — | — |
| | 4 | 85 | — | — | — | 15 | — | — | — | — |
| | 5 | 75 | 15 | — | 10 | — | — | — | — | — |
| | 6 | 50 | 30 | — | 10 | — | 5 | 5 | — | — |
| | 7 | 45 | 30 | — | — | 15 | 5 | 5 | — | — |
| | 8 | 80 | — | 20 | — | — | — | — | — | — |
| | 9 | 95 | — | — | — | — | 5 | — | — | — |
| | 10 | 60 | — | 30 | — | — | 10 | — | — | — |
| Product of the present invention | 11 | 80 | — | — | 10 | — | 10 | — | — | — |
| | 12 | 70 | — | — | 5 | 5 | 5 | — | — | — |
| | 13 | 65 | — | — | 10 | — | 25 | — | — | — |
| | 14 | 70 | — | — | 0 | 10 | 10 | — | 10 | — |
| | 15 | 76 | — | — | 0 | 2 | 20 | — | 2 | — |
| | 16 | 55 | — | — | 0 | 20 | 10 | — | 15 | — |
| Conventional products | 17 | 70 | — | 30 | — | — | — | — | — | — |
| | 18 | 79.5 | — | — | — | — | 7.5 | 2.5 | — | 10.5 |

| Coefficient of friction | Amount of wear (μm) | Structure |
|---|---|---|
| 0.345 | 29.0 | Single body sliding member |
| 0.325 | 15.0 | |
| 0.320 | 12.0 | |
| 0.315 | 12.0 | |
| 0.295 | 13.0 | |
| 0.210 | 5.0 | |
| 0.205 | 6.0 | |
| 0.350 | 35.0 | |
| 0.320 | 45.0 | |
| 0.315 | 29.0 | |
| 0.160 | 3.0 | Single body sliding member and composite sliding member |
| 0.165 | 2.8 | |
| 0.130 | 2.5 | |
| 0.145 | 2.0 | |
| 0.135 | 2.5 | |
| 0.140 | 1.7 | |
| 0.250 | 7.0 | Single body sliding member and composite sliding member |
| 0.220 | 5.0 | |

What is claimed is:

1. A single body sliding member on a metal substrate comprising essentially of a resin composition containing 30-98% by weight of an aromatic polyether ketone, 1-35% by weight of polytetrafluoroethylene and 1-35% by weight of a metal fluoride.

2. A single body sliding member according to claim 1, wherein the aromatic polyether ketone is polyether ether ketone.

3. A single body sliding member according to claim 1, wherein the metal fluoride is lead fluoride and/or calcium fluoride.

4. A single body sliding member according to claim 1 consisting essentially of 5-25% by weight of said polytetrafluoroethylene, 2-20% by weight of said metal fluoride and the remainder said aromatic polyether ketone.

5. A single body sliding member on a metal substrate comprising a resin composition containing 30-97% by weight of an aromatic polyether ketone, 1-35% by weight of poly-, tetrafluoroethylene, 1-35% by weight of a metal fluoride and 1-20% by weight of potassium titanate fiber.

6. A single body sliding member according to claim 3, wherein the aromatic polyether ketone is polyether ether ketone.

7. A single body sliding member according to claim 5, wherein the metal fluoride is lead fluoride and/or calcium fluoride.

8. A single body sliding member according to claim 5 consisting essentially of 5-25% by weight of said polytetrafluoroethylene, 2-20% by weight of said metal fluoride, 2–15% by weight of said potassium titanate fiber, and the remainder said aromatic polyether ketone.

9. A composite sliding member consisting essentially of a metal-backed porous layer which is impregnated and coated on its surface with a resin composition containing 30–98% by weight of an aromatic polyether ketone, 1–35% by weight of polytetrafluoroethylene and 1–35% by weight of a metal fluoride.

10. A composite sliding member according to claim 9, wherein the aromatic polyether ketone is polyether ether ketone.

11. A composite sliding member according to claim 9, wherein the metal fluoride is lead fluoride and/or calcium fluoride.

12. A composite sliding member according to claim 1 consisting essentially of 5–25% by weight of said polytetrafluoroethylene, 2–20% by weight of said metal fluoride and the remainder said aromatic polyether ketone.

13. A composite sliding member comprising a metal-backed porous layer which is impregnated and coated on its surface with a resin composition containing 30–97% by weight of an aromatic polyether ketone, 1–35% by weight of polytetrafluoroethylene, 1–35% by weight of a metal fluoride and 1–20% by weight of potassium titanate fiber.

14. A composite sliding member according to claim 13, wherein the aromatic polyether ketone is polyether ether ketone.

15. A composite sliding member according to claim 13, wherein the metal fluoride is lead fluoride and/or calcium fluoride.

16. A composite sliding member according to claim 13 consisting essentially of 5–25% by weight of said polytetrafluoroethylene, 2–20% by weight of said metal fluoride, 2–15% by weight of said potassium titanate fiber and the remainder said aromatic polyether ketone.

* * * * *